United States Patent [19]

Diehl

[11] 4,054,878

[45] Oct. 18, 1977

[54] RANGING SYSTEM INCLUDING APPARATUS FOR FORMING DIRECTIONAL CHARACTERISTICS AT THE RECEIVING END AND FOR CORRELATING

[75] Inventor: Reiner Diehl, Bremen, Germany

[73] Assignee: Fried. Krupp Gesellschaft mit beschrankter Haftung, Essen, Germany

[21] Appl. No.: 563,118

[22] Filed: Mar. 27, 1975

[30] Foreign Application Priority Data

Mar. 27, 1974 Germany .......................... 2414644

[51] Int. Cl.² .......................... G01S 9/06; G01S 9/68; G02B 5/22
[52] U.S. Cl. .................................. 343/11 R; 340/1 R; 343/100 CL; 350/162 SF
[58] Field of Search .................... 343/100 CL, 11 R; 350/162 SF; 340/1 R

[56] References Cited

U.S. PATENT DOCUMENTS

| | | | |
|---|---|---|---|
| 3,519,331 | 7/1970 | Cutrona et al. | 350/162 SF |
| 3,526,893 | 9/1970 | Skenderoff et al. | 343/100 CL |
| 3,579,180 | 5/1971 | Taddeo | 343/100 CL X |
| 3,787,840 | 1/1974 | Dotson | 343/100 CL X |
| 3,790,926 | 2/1974 | Pekau | 340/5 H X |
| 3,794,406 | 2/1974 | Kock et al. | 350/162 SF |
| 3,810,082 | 5/1974 | Arens | 340/6 R |

OTHER PUBLICATIONS

"Syntheses of Optimum Complex Spatial Filters" by F. T. S. Yu et al., Journal of the Optical Society of America, vol. 62, No. 1, Jan. 1972, pp. 147-149.

Primary Examiner—Malcolm F. Hubler
Attorney, Agent, or Firm—Spencer & Kaye

[57] ABSTRACT

An improved apparatus for the formation of directional characteristics at the receiving end of a ranging system operating according to the reflected-beam ranging technique with acoustical or electromagnetic waves and for correlating the received signals, which apparatus is of the type employing a number of transducers arranged in rotational symmetry in a transmitting-receiving plane, with the transducers emitting pulse-shaped wave energy as their transmitted signals and being connected for reception via a transmitting-receiving switch, and if required via amplifiers, with a scanner which repeatedly interrogates the received signals in succession during one reflected-beam ranging period so that each switch position of the scanner is associated with one directional angle and each interrogation cycle covering all transducers is associated with one directional angle revolution. According to the invention, connected to the output of the scanner is a two-dimensional device for producing a lightwave with an intensity or phase distribution dependent on the directional angle in the one dimension and dependent on the time of reception of the received signals within each ranging period in the other dimension, whereby the wavefront of the produced lightwave is modulated by the successively scanned received signals. This modulated lightwave is fed to the input of a two-dimensional optical correlator, which contains, as the reference function of the correlator, a reference disc with a transmission function which is a measure for the directional characteristic for a transmitted signal received without interference from a reference direction, and the output of the optical correlator is fed to a two-dimensional display device.

13 Claims, 10 Drawing Figures

FIG. 1

RANGING SYSTEM INCLUDING APPARATUS FOR FORMING DIRECTIONAL CHARACTERISTICS AT THE RECEIVING END AND FOR CORRELATING

BACKGROUND OF THE INVENTION

The present invention relates to an improved apparatus for forming directional characteristics at the receiving end of a reflected beam ranging system utilizing acoustical or electromagnetic wave energy and for correlating the received signals, the apparatus employing a plurality of transducers arrranged in rotational symmetry in the transmitting-receiving plane, which transducers emit pulsating wave energy as the transmitted signal and which are connected for reception via a transmitting-receiving switch and possibly amplifiers with a scanner which repeatedly interrogates in succession the signals received by the transducers during one reflected-beam ranging period, with each switch position of the scanner being associated with one directional angle and each interrogation cycle for all transducers being associated with one revolution of the directional angle.

In order to determine the position of an object, a reflected-beam ranging system emits wave energy which is reflected by the object and received again by the ranging system. The time between transmission and reception of the signal corresponds to the distance between the reflecting object and the reflected-beam ranging system. In order to determine the direction of impingement of the reflected wave energy, signals for directional characteristics are formed in the reflected-beam ranging system from the signals received by the transducers, which directional characteristics lie in the transmitting-receiving plane in the shape of a fan, for example. The strongest signal produces the directional characteristic which points in the direction of the object.

German Offenlegungsschrift (Laid-Open Patent Application) No. 2,136,780, corresponding to U.S. Pat. No. 3,810,082 issued May 7th, 1974, to E. Arens, (the subject matter which is incorporated herein by reference) discloses a system in which the signals received by the transducers, which are disposed for example on a cylindrical base, are successively interrogated and then fed to a delaying chain. From the delaying chain the delayed received signals from a group of tranducers are read out according to given delay times to form a directional characteristic, are evaluated as to their amplitudes and are combined in an adder circuit. The delay periods and amplitude evaluations for the received signals depend on the position of the transducers of a group on the cylindrical base with reference to the direction of the directional characteristic to be formed. Since every signal group which is used to form a directional characteristic is disposed on the periphery of the cylindrical base offset by one transducer and the arrangement of the transducers within the group is always the same, the same delay periods result for each group and thus the same taps of the delaying chain and the same amplitude evaluations of the received signals. At the output of the adder circuit there appear, in synchronism with the interrogation of the transducers, a succession of signals for the adjacent directional characteristics.

In order to free the signals from interference, it is known to correlate the interferred with signals with the same but interference-free signals by means of a replica correlator. In the above-mentioned arrangement this would mean that the same number of replica correlators would have to be used as there are transducers on the cylindrical base. The reference function for the correlation could be, for example, the transmitted signal. However, due to the high technical expenditures involved for memories, multiplication and integration circuits, such an arrangement is impractical.

SUMMARY OF THE INVENTION

It is therefore the object of the present invention to provide an arrangement of the above-mentioned type which permits processing of scanned received signals in a reflected-beam ranging system in which analog signal processing for the formation of directional characteristics and correlation with the transmitted signal can be effected without electronic storage means, delaying chains, multiplication, integration and addition circuits and without a loss of time between reception and display of directions and distances of reflected objects.

This is accomplished according to the present invention in that in a ranging system having a transducer and scanning arrangement as indicated above, a two-dimensional device, which produces a lightwave with an intensity or phase distribution dependent on the directional angle in one dimension and dependent on the reception time of the received signal within each ranging period in the other dimension, has its input connected to the output of the scanner whereby the wavefront of the produced lightwave is modulated by the successively scanned momentary values of the received signals, a two-dimensional optical correlator, which contains a reference disc, as the reference function of the correlator, with a transmission function which is a measure for the directional characteristic for a transmitted signal received from a reference direction without interference, is connected to the output of the two-dimensional device so that the input signal of the correlator is the modulated lightwave, and a two-dimensional display device is connected in series with the output of the optical correlator.

Two-dimensional optical correlators for coherent and incoherent light are known and are described, for example, in the book by Joseph W. Goodman, "Introduction to Fourier Optics", published by McGraw-Hill in the Physical and Quantum Electronic Series, Chapter 7, "Spatial Filtering and Optical Information Processing" 1968 especially pages 160 to 163.

The input signal of the two-dimensional optical correlator is a planar modulated lightwave in which the wavefront is determined in the vertical direction by the time of reception of the received signals within the ranging period and in the horizontal direction by the position of the scanner as the directional angle or by the position of the transducer presently being scanned in the arrangement. The pattern itself contains either an intensity or phase distribution which reflects the scanned momentary values of the received signals within one ranging period.

The reference disc in the optical correlator according to the present invention has a transmission function pattern which corresponds to the pattern of the planar modulated wavefront of the lightwave during one ranging period when the transmitted signal from the arrangement of transducers is received from a single reference direction, the individual momentary values of the scanned received signals being additionally subjected to amplitude staggering. The transmission function is also a measure for the beam pointing in the reference direction. According to the present invention for incoherent optical processing the transmission function is equal to the product of the sum of each transmitted signal scanned from the individual transducers and received without interference which signal is shifted in time when it impinges from the reference direction in dependence on the arrangement of the transducers, multiplied by the directional angle dependent amplitude staggering function. When coherent light is used, the transmission function is equal to the Fourier transformation result of the product.

In the optical correlator the pattern of the planar modulated wavefront of the lightwave from one ranging period is compared with this pattern on the reference disc in that the reference disc is two-dimensionally shifted in dependence on the directional angle and the time of reception until the pattern of the planar modulated wavefront of the lightwave is congruent with the pattern of the reference disc. This process corresponds to beam forming and correlation of the received signals with the transmitted signal. At the output of the optical correlator there than appears on the connected display device a bright light spot for each reflection point which spot indicates the direction and time of reception of the wave energy reflected by the reflection points, the object being thus displayed with reference to direction and distance.

The use of one-dimensional optical correlators in the ranging art is known, for example from German Auslegeschrift (Published Patent Application) No. 2,133,524, published Nov. 15, 1973 corresponding to U.S. Pat. No. 3,790,926 issued Feb. 5, 1974, to D. Pekau, in which the optical correlator is used to determine the speed of a vehicle. In this correlator the cross correlation function is formed of pulses of two successive ranging periods and the speed is determined from the position of the correlation maximum. For this purpose a new reference disc must be produced for each ranging period.

In an arrangement according to the present invention, however, the optical two-dimensional correlator always uses the same reference plate or disc to form the direction and free the received signals from interference as long as the transmitted signal remains unchanged.

The manufacture of reference discs is known and is disclosed in the above-mentioned book, for example, in the description of the production of a Vander Lugt filter. The reference disc according to the present invention can be produced according to this method, as can be seen on page 171 to 174 of the Goodman-book. It is likewise possible, according to the present invention, to employ a photograph of the amplitude and phase curves of the transmission function taken from the luminescent screen of a computer as the reference disc in which case the transmission function is calculated in the computer itself.

Since the reference disc is displaced in the correlator in two dimensions until the pattern of the planar modulated wavefront of the liqhtwave is congruent with the pattern of the reference disc so that the direction can be formed and a correlation can be made, it is advisable, according to a further embodiment of the invention, to apply the transmission function onto the reference disc to cover two full revolutions of the directional angle. This assures that objects from all directions of impingement will be unequivocally displayed.

In order to produce the planar modulated lightwave as the input signal for the correlator, the present invention provides, in connection with a reflected-beam ranging system, an electron beam tube in which the vertical deflection is triggered at the beginning of each ranging period and its horizontal deflection is triggered at the beginning of one directional angle revolution of the scanner. The brightness control input of the electron beam tube is connected with the output of the scanner for scanning the transducers so that the brightness is modulated bu the momentary values of the received signals.

A further feature of the present invention provides a so-called Titus tube for the production of a planar, intensity or phase modulated lightwave from a coherent light source. The operation of a Titus tube is described, for example, in "Real Time Input in Optical Systems for Pattern Recognition or Data Storage Using the Titus Tube"by G. Groh et al, Proceedings of the International Symposium of Holography, Besancon (France) July 6-11, 1970. The publisher is Vienot, Bulabois, Pasteur University de Besancon. The Titus Tube is also described in "Philips Technische Rundschau"1969/70, Nr. 8/9/10 in an article "GroBprojektion von Fernsehbildern mit einer optischen Wandlerrohre, die auf dem Pockels-Effekt beruht" by G. Marie and mentioned in the above cited U.S. Pat. No. 3,790,926.

A charge pattern of the scanned received signal is produced on the screen of the Titus tube in dependence on the reception time and on the directional angle. The screen is irradiated from a coherent laser source, the lightwave of which is intensity or phase modulated depending on the charge pattern on the screen of the Titus tube.

According to a further feature of the present invention, a planar phase modulated lighwave from a coherent light source is produced with a two-dimensional device in which an electrostatically charged carrier strip having a thermoplastic coating and a photoconductive coating is brought past a light source with horizontal deflection in which the brightness can be controlled. Such an apparatus is disclosed in German Auslegeschrift (Published Patent Application) No. 2,133,524, published Nov. 15, 1973 corresponding to U.S. Pat. No. 3,790,926. It is also described in the U.S. Pat. No. 3,593,254, issued July 13, 1971 to W. Glenn et al. The drive for the carrier strip is synchronized with the ranging period. The horizontal deflection of the light source is triggered in dependence on the revolution of the directional angle, its brightness is modulated with the scanned momentary values of the received signals. The carrier strip is moved past the light source. The impinging light produces local changes in conductivity on the carrier strip so that a charge pattern is produced which corresponds to the pattern for the ranging period. The carrier strip is further brought past a heat source which transforms the charge pattern into a relief which is illuminated by a laser source so that a planar phase modulated wavefront of the lightwave is produced. The light source provided is an oscilloscope with brightness control input and horizontal deflection or a horizontally deflectable laser beam the intensity of which is modulated by the scanned received signals.

An incoherent, intensity modulated lightwave is produced, according to a further embodiment of the present invention, by an oscilloscope as the incoherent light source where the horizontal deflection is triggered in dependence on the revolution of the directional angle and its vertical deflection is triggered in dependence on the ranging period. The brightness control input of the oscilloscope is again connected with the output of the scanner which scans the individual transducers of the reflected-beam ranging system in succession.

The optical correlator for incoherent processing includes an optical system with associated reference disc which is arranged with respect to the luminescent screen of the oscilloscope at twice the distance of the focal length of the optical system. The reference disc has as the transmission function the so-called real portion of the reference function which is equal to the product of the directional angle dependent amplitude evaluation multiplied by the respective received signals which were received without interference from the reference direction. The display device is disposed at a distance from the reference disc which is at least twice and preferably three to four times the focal length of the optical system.

According to a further embodiment of the invention, an optical correlator is used for incoherent processing which includes two reference discs with lenses which preferably have the same focal length, the real portion of the transmission function being reproduced on the one reference disc and the imaginary portion, i.e., the quadrature component of the transmission function, being produced on the other reference disc. The incoherent, planar intensity modulated lightwave is divided by a beam deflection device into two partial signals which both travel over a path twice the focal length of the lenses associated with the reference discs. A further beam deflection device is provided behind the two reference discs to combine the two filtered partial signals, the partial signals again traveling over equal length paths which are longer than twice the focal length of the lenses. In this correlator, a complex reference function is utilized to correlate the received signals with the transmitted signal and to determine the direction so that even with an unknown starting phase for the received signals it is assured that direction and distance of the reflected objects will be displayed.

The display device which is connected in series with the optical correlator is, for example, a luminescent screen which displays the distance and direction of the reflecting objects in cartesian coordinates. In the radar or sonar art such a display is called a B-scope display. However, a display with true angles which is known as the PPI display is also employed in these arts. In this case the object is displayed in polar coordinates. According to a further feature of the present invention, the display device comprises a television camera with a converter which converts the cartesian coordinate display into a polar coordinate display and an oscilloscope. The electron beam of the oscilloscope is circularly deflected in dependence on the horizontal deflection of the television camera and radially deflected in dependence on the vertical deflection of the television camera.

The advantages realized with the present invention are in particular that the optical direction formation and correlation produces, in a particularly simple manner, a direct evaluation of the received signals. The planar modulated wavefront of the lightwave which reproduces the received signals from the ranging period can easily be produced with optical devices known from the holographic art. The relief is produced either by intensity modulation by means of an electron beam tube or by phase modulation by means of an arrangement with an appropriately prepared carrier strip. It is further an advantage that the reference disc need be produced but once in the optical correlator since its transmission function depends merely on the arrangement of the transducers in rotational symmetry in the receiving plane and on the transmitted signal. If the transmission function is recorded on the reference disc over a period of two full directional angle revolutions, there exists the advantage that complete congruence of the pattern of the planar modulated lightwave with the pattern of the reference disc is realized for all directions of the impinging wave energy so that an optimum display of distance and direction of the object is assured. A great simplification of signal processing is realized when the signals are processed incoherently in that no laser source and no laser modulating device are required for the input signal of the optical correlator. The apparatus according to the present invention is distinguished by high dependability even when large numbers of data are processed with high resolution of direction and distance of the object since only a few components are required to reduce such system to practice.

DESCRIPTION OF THE PREFERRED EMBODIMENTS

Figure 1:
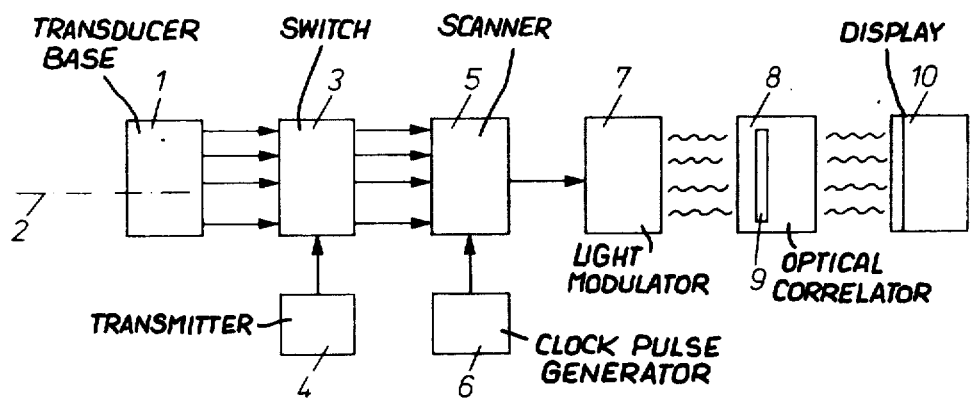
FIG. 1 is a simplified block circuit diagram of the apparatus according to the present invention.

Referring now to FIG. 1, there is shown a block circuit diagram of a reflected-beam ranging system according to the invention. In a known manner, on a base 1, a number $n$ of transducers W (see FIG. 2) for electromagnetic or acoustical waves are arranged in rotational symmetry in a transmitting-receiving plane 2. Each transducer W is electrically connected with a transmitter 4 which provides pulse shaped wave energy via a transmitting-receiving switch 3. During the transmission, wave energy is emitted by the $n$ transducers W in a pulsating manner either in synchronism or for given directions. The transmitting-receiving switch 3 is also connected with a scanner 5. After transmission, the transmitting-receiving switch 3 is switched to its receive position and the signals received by the $n$ transducers W are fed to the scanner 5 wherein they are interrogated in succession, so that at the output of scanner 5 the momentary values of the received signals appear in succession. The scanner 5 is connected with a clock pulse generator 6 which controls the scanner 5 with a clock pulse frequency which is at least twice the product of the maximum received bandwidth of the received signals and the number $n$ of transducers W. Each switch position of scanner 5 corresponds to one transducer with the alignment of a particular transducer in the transmitting-receiving plane 2 being equal to a directional angle $\phi$ in the transmitting receiving plane 2. One revolution of the scanner in which all $n$ transducers are interrogated in succession constitutes one directional angle revolution $\phi = 2\pi$.

The wave energy reflected by objects is to be displayed in dependence on their distance and direction. For this purpose directional characteristics are formed in the transmitting-receiving plane 2 where the directions correspond to the alignments of the transducers and thus to directional angles $\phi$. In a two dimensional device 7 which is connected in series with the output of the scanner 5, a planar modulated lightwave is produced in dependence in the directional angle $\phi$ and on the reception time of each individual received signal within each ranging period, the wavefront of the lightwave being modulated in dependence on the magnitude of the scanned momentary values of the received signals. Two forms of modulation are possible according to the present invention, either an intensity modulation or a phase modulation.

To evaluate the output signals from the device 7, a two-dimensional optical correlator 8 is connected to the output of device 7. The planar modulated lightwave is correlated with the transmitted signal in the optical correlator 8 and is subjected to a direction evaluation. For this signal processing, a reference disc 9 is provided in the optical correlator 8 as the reference function and its transmission function is a measure for the directional characteristic for a transmitted signal which was received without interference from a reference direction. The display of the received signals in dependence on the directional angle and their time $t$ of reception is effected on display device 10.

Figure 2:
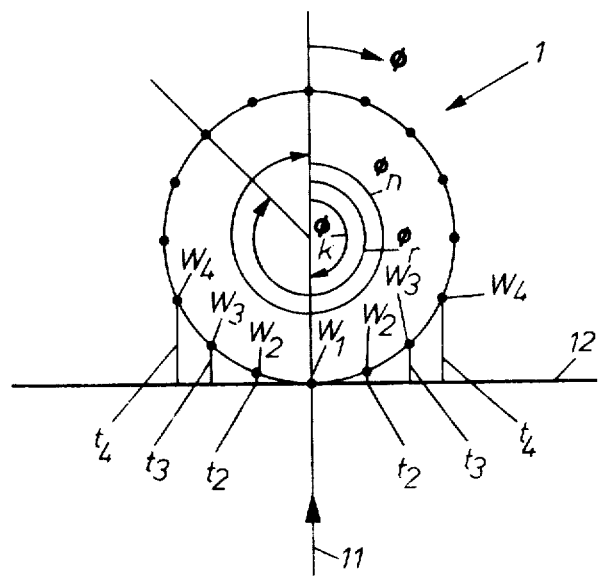
FIG. 2 is a schematic illustration of one embodiment of a transducer arrangement for the apparatus according to the invention.
Figure 3A:
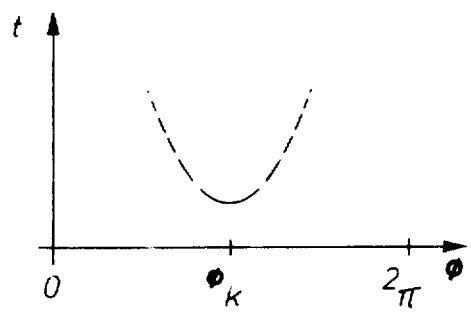
FIGS. 3a and 3b are curves of received signals.
Figure 3B:
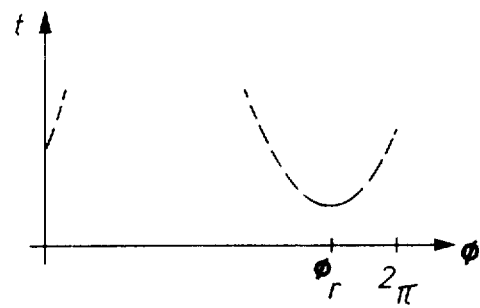

FIG. 2 will serve to explain the reference function. It shows a rotationally symmetrical arrangement of $n$ transducers W which are arranged in a circle in the transmitting-receiving plane 2. A cylindrical basis would of course also be conceivable where a plurality of transducers are arranged above one another in concentric circles, with superposed transducers being electrically connected together. With such a base 1 it is possible to receive wave energy in dependence on direction. If wave energy impinges on base 1 from a reference direction 11, transducer W1 is the first to receive a planar wavefront, then a little later with a delay of $t2$ the two transducers W2 receive the same planar wavefront, then with a delay $t3$, the two transducers W3, and finally, with a delay of $t4$, transducers W4. This shift in time from $t2$ to $t4$ is determined by a line from the individual transducers W1 to W4 which is perpendicular to a line 12, divided by the propogation speed of the wave energy. FIG. 3a shows an illustration of the received signals as a function of directional angles $\phi$ and the reception time $t$, the reception time $t$ being plotted as the ordinate and the directional angle $\phi$ being plotted as the abscissa, for a direction of impingement of the wave energy at an angle $\phi_k$ with the reference direction 11. FIG. 3b shows received signals at transducers W for a direction of impingement of the wave energy at a directional angle $\phi_r$.

An improvement in a sharper bundling of the beam to be formed with the delayed received signals can be realized by a directional angle dependent amplitude evaluation of the received signals according to an amplitude staggering function, in which ancillary peak formations are reduced. Such a signal processing is utilized for producing the reference function of correlator 8 for the interference-free reception of the received signal from reference direction 11. The directional angle dependent amplitude evaluation of the received signals is described in the above mentioned U.S. Pat. No. 3,810,082 in column 11, line 15 - 25.

Figure 3C:
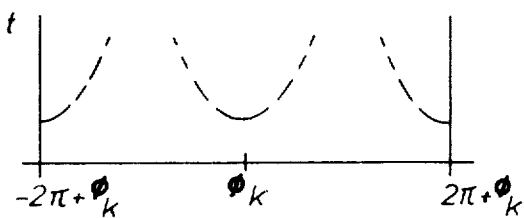
FIG. 3c is a diagram of a reference function.

FIG 3c is a diagram of the reference function during two full revolutions of the direction angle $\phi = 4\pi$ for a CW pulse as the transmitted signal. The transmission function for referencee disc 9 is produced with this reference function.

In the device 7 a planar modulated lightwave is produced from the scanned momentary values of the received signals from a ranging period in that the wavefront is modulated with a pattern, which is of the type, for example, as shown in FIGS. 3a or 3b, is dependence on the time $t$ of reception and the directional angle $\phi$. In the optical correlator 8 the pattern according to FIG. 3a is then caused to become congruent with the pattern of FIG. 3c. A pattern according to FIG. 3b can be brought into congruence with the pattern of the reference function in a particularly advantageous manner if, as shown in FIG. 3c, the transmission function contains the reference function over two revolutions of the direction angle $\phi = 4\pi$.

For a coherent, planar modulated lightwave which forms the input signal of the optical correlator 8, the transmission function of the reference disc 9 is the two-dimensional Fourier transformed result of a product of the sum of the scanned, delayed, interference-free received signals of the transmitted signal, multiplied by the directional angle dependent amplitude staggering function. With incoherent processing in the optical correlator 8, the transmission function is directly equal to this product.

The amplitude and phase curves of the transmission function for the reference disc may be calculated, for example, in a computer and then displayed on a viewer. The reference disc 9 may then be produced by making a photograph of the image on the computer viewer. Another possibility for producing the reference disc 9 is given by the above mentioned technique known as the "Van der-Lugt filter".

Figure 4:
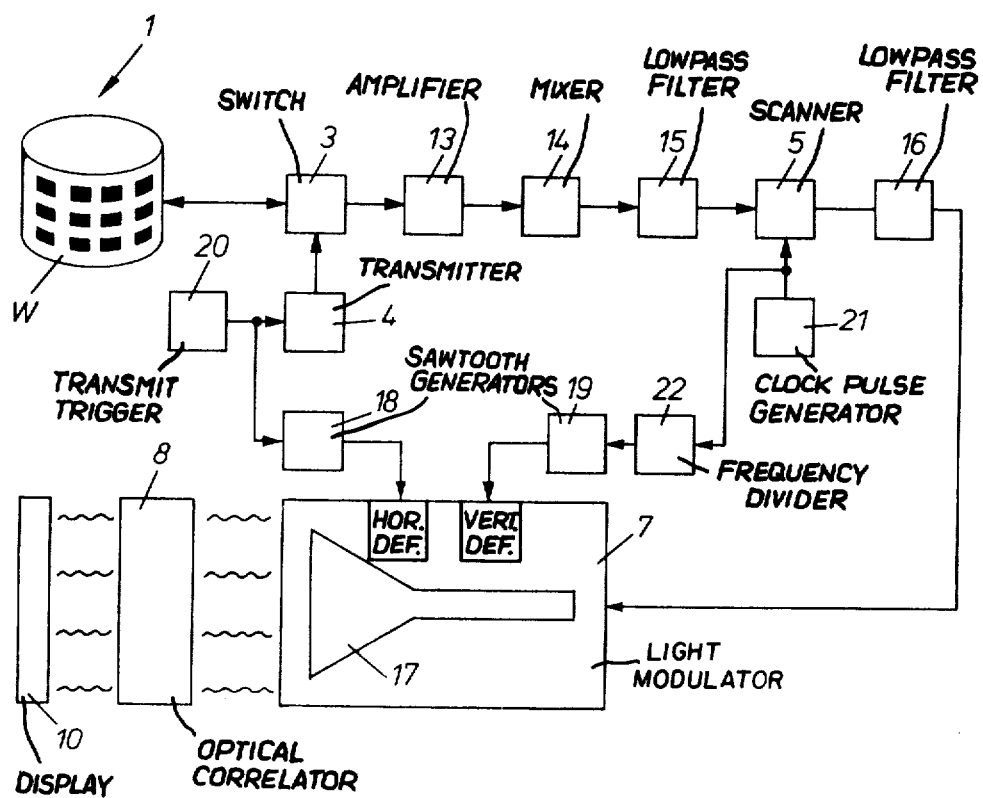
FIG. 4 is a block diagram of a specific embodiment of the invention generally shown in FIG. 1.

FIG. 4 shows a reflected-beam ranging device in connection with one embodiment of the device 7. As shown in FIG. 4, the base 1 is a cylindrical base where the transducer strips are supplied, via the transmitting-receiving switch 3, with a pulse-shaped, for example linear frequency modulated transmitted signal from transmitter 4. The transmitting-receiving switch 3 is connected with scanner 5 via the series connection of a control amplifer 13, a mixer 14 and a lowpass filter 15. The output signal of the scanner 5 is connected with an input of device 7 via a series connected lowpass filter 16, which is provided in order to suppress switching peaks originating in the scanner 5.

According to this embodiment of the invention, the two-dimensional device 7 for producing a planar intensity modulated wavefront of the lightwave includes an electron beam tube 17, e.g. a cathode ray tube, the brightness keying or control input of which is connected with the output of lowpass filter 16. To display the received signals in two dimensions in dependence on the directional angle $\phi$ and the time $t$ of reception, the vertical deflection and the horizontal deflection of the electron beam tube 17 are provided by sawtooth generators 18 and 19 respectively. The ranging period is initiated by a transmitting trigger circuit 20, the output of which is connected to and controls both the transmitter 4 and the sawtooth generator 18 for the vertical deflection. The scanner 5 is connected to and controlled by the output signal from a clock pulse generator 21 whose clock pulse frequency must be at least twice the value of the product of receiving bandwidth of the ranging system and number $n$ of the transducer strips. Via a frequency divider 22, which has a dividing ratio equal to the number $n$ of transducer strips, the output signal of clock pulse generator 21 is also connected with the sawtooth generator 19 for the horizontal deflection so that at the beginning of each directional angle revolution of the scanner 5 the horizontal deflection is triggered. The planar intensity modulated lightwave appearing at the output of device 7 serves as the input signal of the optical correlator 8 whose output signal is displayed with the aid of a display device 10.

Figure 5:
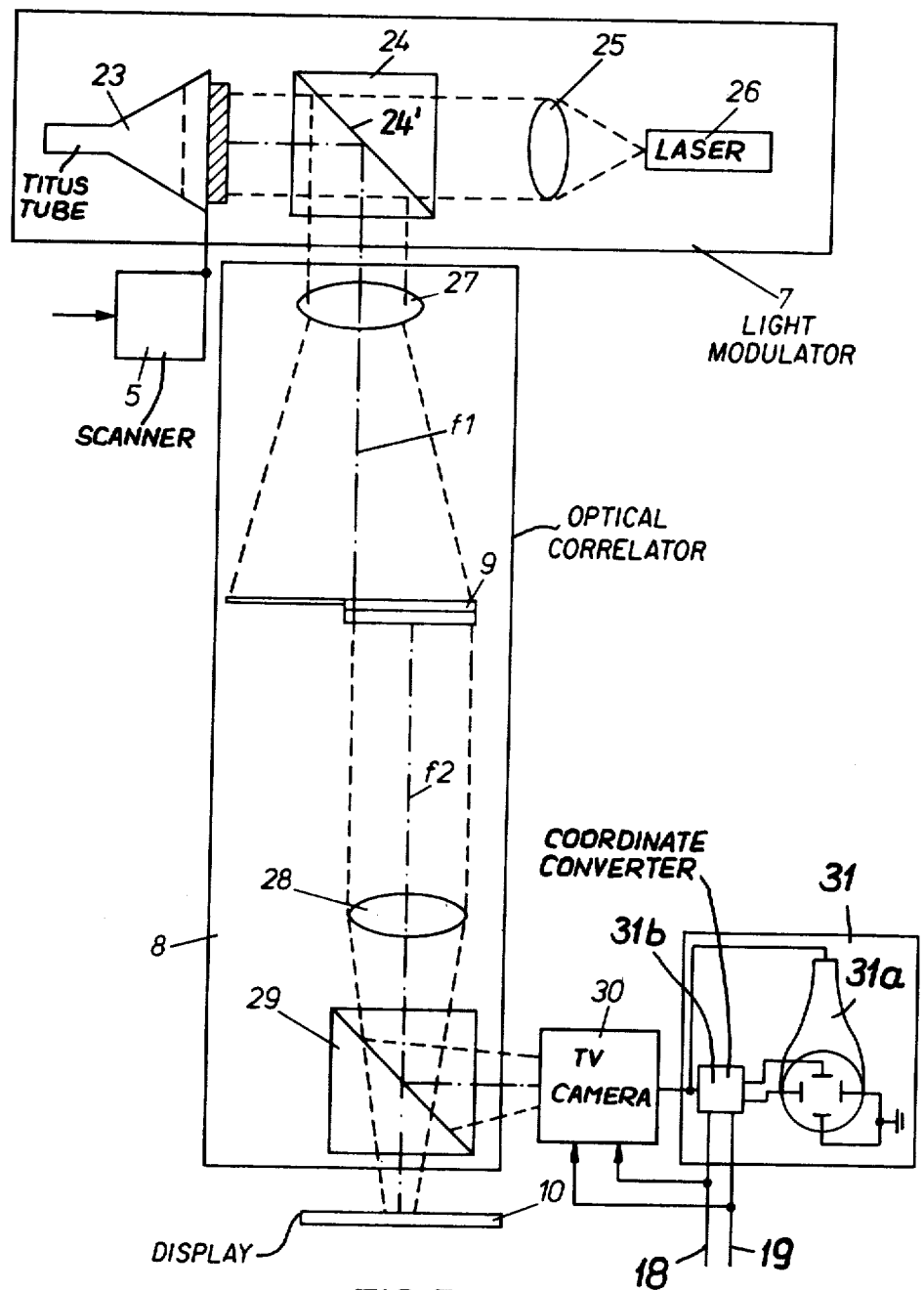
FIG. 5 is a schematic diagram of one embodiment of a device for producing a planar coherent intensity modulated lightwave and of an associated correlator for use in the system of FIG. 4.

FIG. 5 shows a further embodiment of the device 7 and the correlator 8 of the apparatus according to the present invention shown in FIG. 4. According to this embodiment, the two-dimensional device 7 produces a coherent lightwave with a planar intensity modulated wavefront and here comprises a so-called Titus tube 23 as the electron beam tube, a beam splitter 24, a collimator lens 25 and a laser 26. The collimator lens 25 is positioned in the path of the light from the laser 26 so as to direct same onto screen of the Titus tube 23 via the beam splitter 24 which is of the type having a semi-reflective surface 24′ which passes light traveling in one direction, i.e, from the laser 26 toward the Titus tube 23, but which reflects light traveling in the other direction, i.e., from the Titus tube 23 toward the laser 26. With this arrangement, the coherent lightwave from the laser 26 passes through the lens 25 and the beam splitter 24 and irradiates the screen of the Titus tube 23 where it is intensity modulated by the pattern on the screen of the Titus tube 23. The light reflected from the Titus tube 23 is in turn reflected by the surface 24′ and leaves the beam splitter 24 in the downward direction as illustrated and is then fed to the correlator 8 in order to be further processed. The Titus tube 23 is controlled in the same manner as described in connection with the electron beam tube 17 of FIG. 4. The signals from the scanner are fed to an electrode near the screen, as it is described in the above cited article by G. Marie.

The optical correlator 8 for coherent processing shown in FIG. 5 includes a lens 27 with a focal length $f1$, the reference disc 9 and a further lens 28 with a focal length $f2$ having a beam splitter 29 associated therewith. Lens 27 and reference disc 9 are spaced at the distance equal to the focal length $f1$. Additionally, the lens 27 is positioned such that the path traveled by the planar intensity modulated lightwave travels from the screen of the Titus tube 23 through beam splitter 24 to lens 27 is also equal to the focal length $f1$.

Lens 28 is arranged at a distance equal to its focal length $f2$ from the reference disc 9. The light beam leaving lens 28 is directed via the beam splitter 29 to the display device 10 or to a television camera 30 which are each positioned from the lens 28 by a distance equal to focal length $f2$. In the television camera 30, the light beam coming from the optical correlator 8 is then converted to electrical signals, which are in turn fed to a monitor 31 which in a known manner provides a PPI display of the directional angle $\phi$ and the time $t$ of reception. The PPI display is described for instance in the U.S. Pat. No. 3,267,470, issued Aug. 16, 1966, to R. F. Riggs. The monitor may, for example, include an oscilloscope 31a and a converter 31b for converting the output signal of the camera 30 in cartesian corrdinates into polar coordinates with the circular deflection of the electron beam of the oscilloscope being in synchronism with the horizontal deflection of the camera and the radial deflection of the electron beam of the oscilloscope beinging synchronism with the vertical deflection of the camera. This is done in the converter 31b by amplitude-modulating a sine-voltage and a cosine-voltage with the output signals of the saw tooth generators 18, 19, for deflecting the electron beam of the oscilloscope 31a. The brightness control of the oscilloscope 31a is connected to the output of the camera 30.

Figure 6:
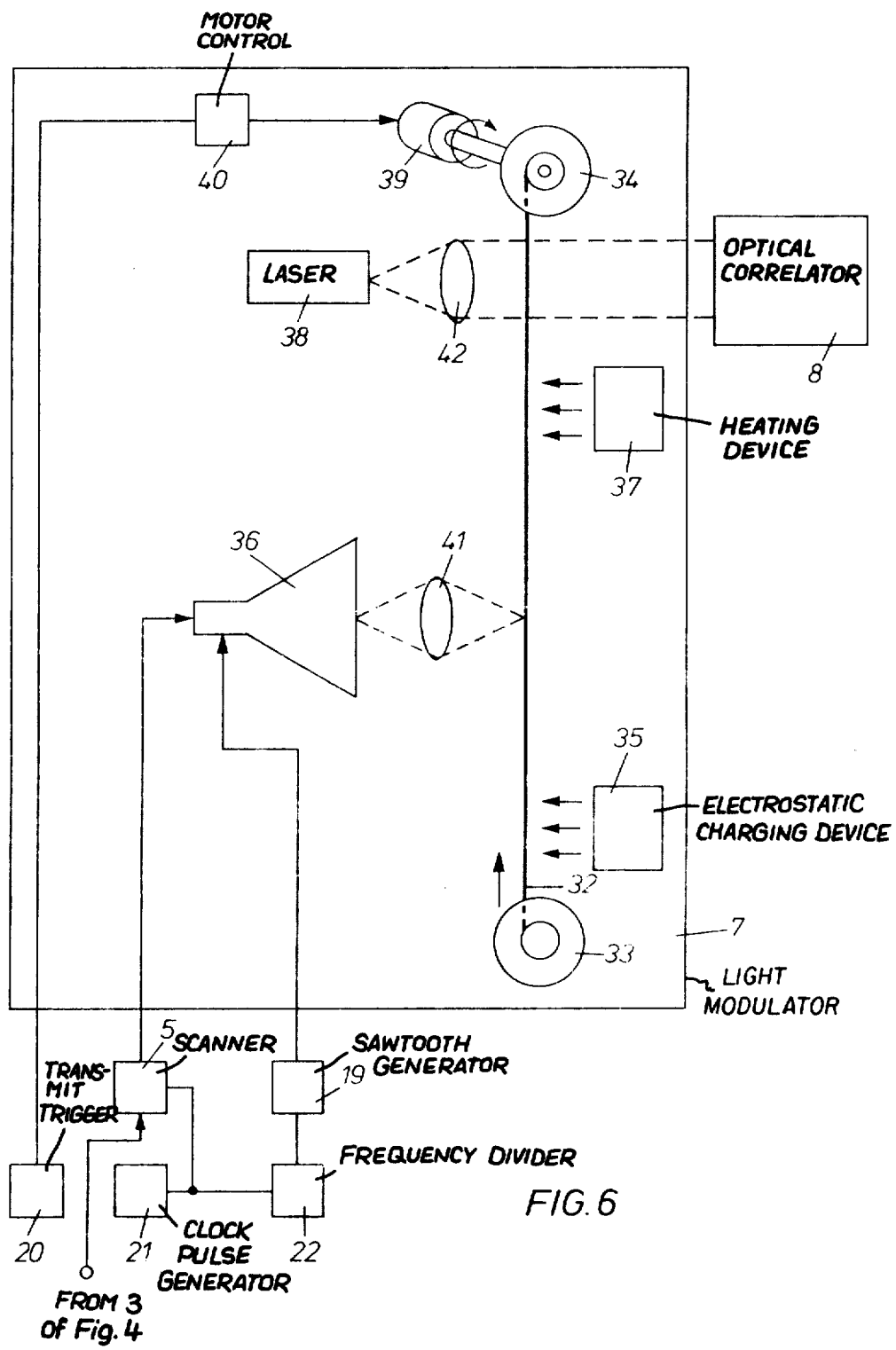
FIG. 6 is a schematic diagram of one embodiment of a device for producing a planar coherent phase modulated lightwave for use in the system of FIG. 4.

FIG. 6 shows a device 7 for producing a lightware with a planar phase modulated wavefront as the input signal of the correlator 8. The device 7 in this case includes a carrier strip 32 with a thermoplastic coating under which there is a photoconductive layer. Such a carrier strip 32 is described in the above mentioned U.S. Pat. No. 3,790,926 and also in the U.S. Pat. No. 3,593,254 by F. B. Gorman. The carrier strip 32 is mounted on two winding elements or reels 33 and 34 in a manner so that it can successively be brought past an electrostatic charging device 35, the screen of an oscilloscope 36, a heat source 37 and a laser 38. To provide this movement, the winding element or reel 34 is driven by a motor 39 whose number of revolutions and thus the transporting speed of the carrier strips 32 being determined in a control device 40 in dependence on the ranging period. For this purpose the control device 40 is connected with the output of transmitting trigger circuit 20 (FIG. 4). Such a control device 40 is described in the German Offenlegungsschrift No. 1,462,616 to T. H. Gifft, published Jan. 9, 1969 corresponding to the U.S. patent application Ser. No. 473,274 filed July 15, 1965 now U.S. Pat. No. 3,369,250 issued Feb. 13, 1968.

On the screen of the oscilloscope 36 there is provided the scanned momentary values of the received signals at the output of scanner 5 in dependence on the directional angle $\phi$. For this purpose the horizontal deflection of the oscilloscope 36 is controlled by the output of the sawtooth generator 19 (FIG. 4) which itself is controlled by the output clock pulse frequency generator 21 via frequency divider 22. The brightness control of the oscilloscope 36 is effected via scanner 5. A vertical deflection in dependence on the time of reception $t$ of the received signals is not required since the carrier strip 32 is transported past the oscilloscope 36 in synchronism with the ranging period.

The brightness distribution on the screen of the oscilloscope 36 produces a local change in conductivity via lens 41 by exposure of the photoconductive layer of the carrier strip 32 so that a charge image is produced. The subsequent heating of the carrier strip 32 by heat source 37 produces a relief, the structure of which is determined by the charge image on carrier strip 32. This relief is then illuminated by laser source 38 via lens 42 so that a coherent lightwave with a planar phase modulated wavefront is produced which is further processed in the optical correlator 8.

Figure 7:
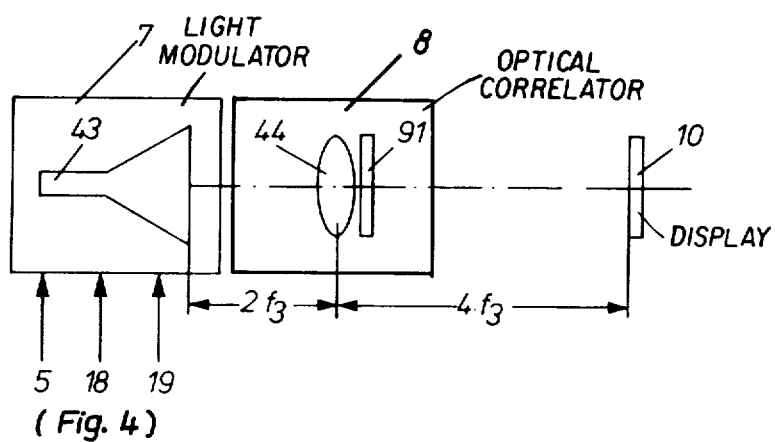
FIG. 7 is a schematic diagram of an optical correlator for incoherent processing in the system according to the invention.

FIG. 7 shows an arrangement in which an incoherent light-wave is processed in the optical correlator 8. An oscilloscope 43 with horizontal and vertical deflection is controlled as described in connection with the electron-beam tube 17 of FIG. 4. The scanned momentary values of the received signals from transducer W are displayed on the screen of the oscilloscope 43 in dependence on the directional angle $\phi$ in the horizontal direction and in dependence on the time $t$ of reception in the vertical direction as brightness dots the brightness of which is dependent on the magnitude of the momentary values. The incoherent lightwave leaving the screen with a planar intensity modulated wavefront enters the optical correlator 8 which includes a lens 44 having a focal length $f3$ and a reference disc 91 disposed immediately therebehind. Lens 44 is disposed at a distance from the screen of the oscilloscope 43 which is twice its focal length $f3$. At a greater distance behind the disc 91, for example, at three to four times the focal length $f3$, a luminescent screen is provided is the display device 10.

In this embodiment, the reference disc 91 contains as the transmission function the real portion of the reference function. This real portion is formed of the product of the directional angle dependent amplitude staggering function multiplied by the respective received signals received without interference from the reference direction 11.

Figure 8:
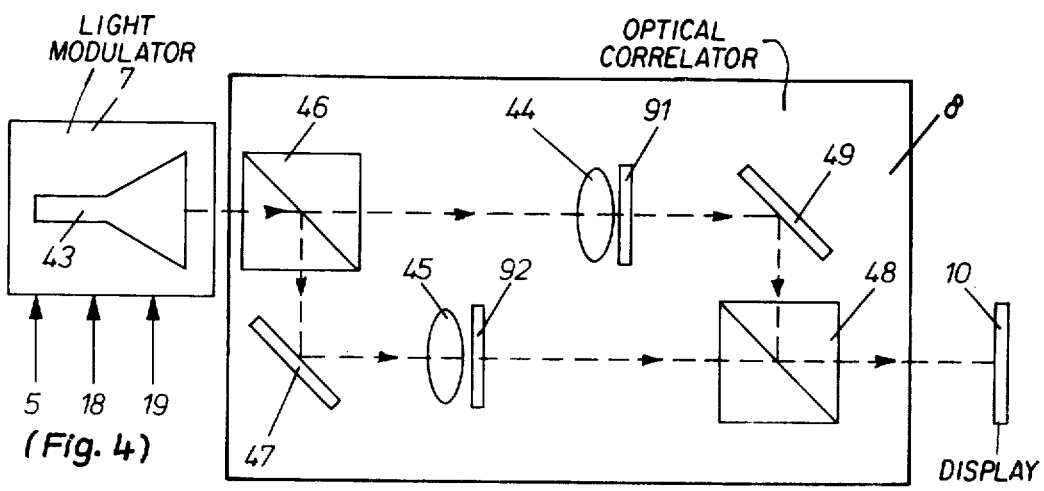
FIG. 8 is a schematic diagram of a modification of the optical correlator of FIG. 7.

FIG. 8 shows a further embodiment of the optical correlator 8 of FIG. 7. The device 7 includes an oscilloscope 43 which is controlled, in the same manner as described in connection with the electron-beam tube 17 of FIG. 4, by the scanned received signals at the output of scanner 5 for the brightness modulation and by the sawtooth voltages at the outputs of sawtooth generators 18 and 19 for its vertical and horizontal deflection.

In the optical correlator 8 the incoherent lightwave from device 7 is fed to a beam splitter 46 which splits the beam into two partial signals. A first of these partial signals, i.e., the signal which passes directly through the beam splitter 46, is conducted via a lens 44 through the subsequently disposed reference disc 91 which contains a reference function equal to the real portion of the transmission function. The second partial signal which leaves the beam splitter 46, i.e., the signal which leaves at a right angle, is conducted via a mirror 47, which is disposed at an angle of 45° with respect to the beam path of the second partial signal, and a lens 45 to a further subsequently disposed reference disc 92. The reference disc 92 contains the imaginary portion, i.e., the quandrature component, of the transmission function. The two lenses 44 and 45 have the same focal length $f4$ and are positioned so that the planar intensity modulated wavefront of the incoherent lightwave passes over the same beam path lengths from the screen of oscilloscope 43 via beam divider 46 to lenses 44 and 45 respectively. This beam path length is equal to twice the focal length $f4$ of lenses 44, 45.

The two filtered partial signals exiting from the reference discs 91 and 92 are combined again in a further beam splitter 48. As shown, the beam splitter 48 is disposed in the beam path of the second partial signal. Accordingly, in order to combine the two partial signals, the first filtered partial signal is conducted to beam splitter 48 via a mirror 49 which is disposed at an angle of 45° to the beam path of the first partial signal. The two combined filtered partial signals leaving beam splitter 48 are displayed on the screen of the display device 10. The path lengths traversed by the filtered partial signals from reference discs 91 and 92 to display device 10 are of equal length and are at least twice, and preferably three to four times, as long as the focal length $f4$ of lenses 44, 45.

It is to be understood that in the above embodiments, instead of the simple lenses, a lens system can also be used.

It will be understood that the above description of the present invention is susceptible to various modifications, changes and adaptations, and the same are intended to be comprehended within the meaning and range of equivalents of the appended claims.

I claim:

1. In an apparatus for the formation of beams characteristics at the receiving end of a ranging system operating according to the reflected-beam ranging technique with acoustical or electromagnetic waves and for correlating the received signals, said apparatus including a plurality of transducers arranged in rotational symmetry in a transmitting-receiving plane, a transmitter for providing pulse-shaped wave energy to be transmitted by said transducers and a transmitting-receiving switch for selectively connecting said transducers to said transmitter to cause the transmission of wave energy or, in order to evaluate the reflected energy, to a scanner means for repeatedly interrogating the received signals in succession during one reflected-beam ranging period, each switch position of said scanner being associated with one directional angle and each interrogation cycle covering all transducers being associated with one directional angle revolution; the improvement comprising: a two-dimensional light producing means, responsive to the output from said scanner means, for producing a light-wave output with an intensity or phase distribution dependent on the directional angle in one dimension and dependent on the time of reception of the received signals within each ranging period in the other dimension, whereby the wavefront of the lightwave output is modulated by the successively scanned received signals; a series-connected, two-dimensional optical correlator means, having its input connected to the output of said light producing means and containing a reference disc, as the reference function of the correlator, with a transmission function which corresponds to directional characteristic for a transmitted signal received without interference from a reference direction, for correlating the input signal thereto with said reference function; and a two-dimensional display device connected in series with the output of said optical correlator means.

2. Apparatus as defined in claim 1 wherein said light producing means produces a coherent planar modulated lightwave output and said transmission function of said reference disc is the Fourier transformed result of a product which is formed of the sum of each scanned transmitted signal received without interference at the individual transducers and shifted in time in dependence on the arrangement of the transducers and according to its direction, multiplied by a directional angle dependent amplitude staggering function.

3. Apparatus as defined in claim 1 wherein said light producing means produces an incoherent modulated lightwave output and said transmission function is equal to a product of the sum of each scanned transmitted signal which has been received without interference by the individual transducers and shifted in time according to its direction dependent on the arrangement of the transducers, multiplied by a directional angle dependent amplitude staggering function.

4. Apparatus as defined in claim 1 wherein said reference disc has said transmission function over two full directional angle revolutions.

5. Apparatus as defined in claim 1 wherein said reference disc is a photograph of an amplitude and phase curve of said transmission function which has been calculated in a computer, the photograph being taken from a viewing device of the computer.

6. Apparatus as defined in claim 1 wherein said reference disc is a Vander Lugt filter.

7. Apparatus as defined in claim 1 wherein said scanner means is a multiplexer which is connected to and controlled by a clock pulse generator having a clock pulse frequency which is at least twice the product of the maximum receiving bandwidth and the number of transducers; and wherein said two-dimensional light producing means includes: an electron-beam tube having a signal control input and horizontal and vertical deflection units, said signal control input being connected to the output of said scanner means; first and second triggerable sawtooth generators having their outputs connected to said vertical and horizontal deflection units respectively; said first sawtooth generator having its trigger input connected to the output of a transmitting trigger circuit which initiates the reflected-beam ranging period; a frequency divider for dividing the clock pulse frequency of said clock pulse generator by the number of said transducers; and said other sawtooth generator having its trigger input connected with said clock pulse generator via said frequency divider.

8. Apparatus as defined in claim 7 wherein: said electron beam tube is a cathode ray picture tube and said control signal input is the brightness control input of said cathode ray tube, whereby said light producing means produces a planar incoherently intensity modulated lightwave output.

9. Apparatus as defined in claim 7 wherein said electron beam tube is a Titus tube; and wherein said two dimensional light producing means produces a planar coherent intensity modulated lightwave output and further comprises: a laser positioned so that the laser beam therefrom is directed toward the screen of said Titus tube; a collimator lens in the path of said laser beam; and a beam splitting means positioned in the path of said laser beam between said lens and said screen for passing said laser beam to permit same to irradiate said screen and be planar intensity modulated by the charge pattern on said screen of said Titus tube and for directing the thus modulated laser beam to the input of said optical correlator.

10. Apparatus as defined in claim 1 wherein said scanner means is a multiplexer which is connected to and controlled by the output of a clock pulse generator whose clock pulse frequency is at least twice the product of the maximum received bandwidth and number of said transducers; and wherein said two-dimensional light producing device produces a coherent lightwave with a phase modulated wavefront and comprises; an electrostatically chargeable carrier strip having a thermoplastic layer under which there is a photoconductive layer; an electrostatic charging means; a light source having a brightness control input and a horizontal deflection control input; a heat source; a laser; transport means for moving said carrier strip in succession, and in synchronism with said ranging period, passed said electrostatic charging means, said light source, said heat source and said laser; means for connecting said brightness control input of said light source to the output of said scanner means; a frequency divider connected to said clock pulse generator for dividing the clock pulse frequency output of said clock pulse generator by the number of said transducers; and a triggerable sawtooth generator having its output connected to said horizontal deflection unit input and its output connected to the triggerable input of said sawtooth generator, whereby the light from said laser passing through the relief formed by illuminating and heating the carrier strip provides the planar phase modulated lightwave output of said light producing means.

11. Apparatus as defined in claim 1 wherein: said light producing means produces an incoherent modulated lightwave output, said optical correlator means includes a lens positioned immediately in front of said reference disc at a distance equal to twice its focal length from the output of said light producing means, said reference disc having as its transmission function the real portion of said reference function which is equal to the product of a directional angle dependent amplitude staggering function multiplied by the respective received signals which were received without interference from a reference direction; and said displaying device is disposed at a distance from said reference disc which is greater than twice the focal length of said lens.

12. Apparatus as defined in claim 1 wherein: said light producing means produces an incoherent intensity modulated lightwave output; said optical correlator means includes two of said reference discs with a first of said reference discs containing the real portion of said transmission function and the second of said reference discs containing the imaginary portion of said transmission function, first and second lenses with identical focal length positioned immediately in front of said first and second reference discs respectively, means including a beam splitter for dividing the planar intensity modulated lightwave output of said light producing means into two partial signals, each of said first and second lenses and its associated reference disc being positioned in the path of a respective one of said two partial signals so that the same beam path lengths result and the total beam path length from the output of said light producing means to the respective one of said lenses is twice the focal length of said lenses, and means including beam deflection device for combining the two filtered partial signals exiting from said reference discs so that the two filtered partial signals again traverse identical path lengths; and said displaying device is disposed at a distance from the output of said means for combining so that the total path length from a respective one of said reference discs to said displaying means is greater than twice the focal length of said lenses.

13. Apparatus as defined in claim 1 wherein said displaying device comprises: a television camera for receiving the output signal from said correlator means; and means for providing a polar coordinate display of the cartesian coordinate input signal to said camera including an oscilloscope and a converter means for converting the cartesian coordinates into polar coordinates with the circular deflection of the electron beam of said oscilloscope in synchronism with the horizontal deflection of said television camera and the radial deflection of said electron beam in synchronism with the vertical deflection of said television camera.

* * * * *